United States Patent [19]

Willinger

[11] 4,012,819
[45] Mar. 22, 1977

[54] CYLINDRICAL ABRADING TOOL
[75] Inventor: Karl Willinger, Vienna, Austria
[73] Assignee: Firma Hans Ehgartner, Vienna, Austria
[22] Filed: Sept. 8, 1975
[21] Appl. No.: 611,263

Related U.S. Application Data

[63] Continuation-in-part of Ser. No. 511,619, Oct. 3, 1974, Pat. No. 3,927,447.

[30] Foreign Application Priority Data

May 10, 1974 Austria .............................. 3890/74
Sept. 6, 1974 Austria .............................. 7209/74

[52] U.S. Cl. .................................................. 29/79
[51] Int. Cl.² ........................................ B23D 71/00
[58] Field of Search ................................ 29/78, 79

[56] References Cited
UNITED STATES PATENTS

| 1,566,313 | 12/1925 | Cornell | 29/78 X |
| 2,703,446 | 3/1955 | Jensen | 29/79 |
| 3,074,148 | 1/1963 | Heinmeter | 29/79 |
| 3,259,959 | 7/1966 | Tobey | 29/79 |
| 3,528,151 | 9/1970 | Walter | 29/78 |
| 3,618,187 | 11/1971 | Jensen | 29/79 |

Primary Examiner—Harrison L. Hinson
Attorney, Agent, or Firm—Karl F. Ross; Herbert Dubno

[57] ABSTRACT

A cylindrical abrading tool, such as a tire rasp, has a hollow body formed from a stack of blades — or a single helicoidally wound blade — with toothed outer edges sandwiched between a pair of apertured end disks. The blade tiers and disks are interconnected by axially extending mounting bolts, with maintenance of generally radial air-circulation passages between adjacent tiers by means of interposed spacers which may comprise lugs bent out of the blade planes or arcuate inserts with channeled transverse faces.

7 Claims, 6 Drawing Figures

CYLINDRICAL ABRADING TOOL

CROSS-REFERENCE TO RELATED APPLICATION

This application is a continuation-in-part of my prior U.S. patent application Ser. No. 511,619 filed October 3, 1974, now U.S. Pat. No. 3,927,447.

FIELD OF THE INVENTION

My present invention relates to an abrading tool such as a rasp used for the scraping of worn rubber tires preparatorily to recapping, retreading or vulcanization of the carcass.

BACKGROUND OF THE INVENTION

Conventional tire rasps have a generally cylindrical, usually hollow body formed from a multiplicity of tiers of arcuate cutting elements with toothed outer edges, these cutting elements being either a set of separate blades (each of which could be composed of several arcuate segments) or the turns of a single helicoidally wound blade. In order to provide the necessary clearances between the annular rows of teeth carried by these cutting elements, especially where the teeth are set so as to project laterally beyond the transverse blade faces, adjoining tiers are ordinarily separated by annular spacers assembled with the blade or blades and with two end disks into a stack.

Such tools, when used for the scraping of rubber tires or the like, tend to heat up to temperatures well above 300° C which accelerate the wear of the cutting teeth and thus foreshorten the useful life of the tool.

OBJECTS OF THE INVENTION

The general object of my present invention is to provide an improved abrading tool, specifically a tire rasp, adapted to be effectively cooled in operation with resulting increase in service life.

Another, related object is to provide a tool of reduced weight compared with conventional constructions of the same general type.

A further object is to provide means in such a tool for helping keep off particles of rubber or the like which might otherwise become lodged between the tiers of the stack in conventional tire rasps.

SUMMARY OF THE INVENTION

As disclosed in my prior application and patent above referred to, a tool as broadly described above can be effectively cooled by providing the end disks with apertures and so shaping the spacing means between the tiers as to form a multiplicity of generally radial passages communicating with these apertures to facilitate the circulation of air through the tool body.

According to a more specific feature of my invention, likewise disclosed in my prior application, the spacing means may be lugs which are integral with the blade means forming the several tiers of cutting elements, the lugs extending substantially perpendicularly to a plane transverse to the disk axis.

BRIEF DESCRIPTION OF THE DRAWING

The above and other features of my invention will now be described in detail with reference to the accompanying drawing in which.

SPECIFIC DESCRIPTION

Figure 1:
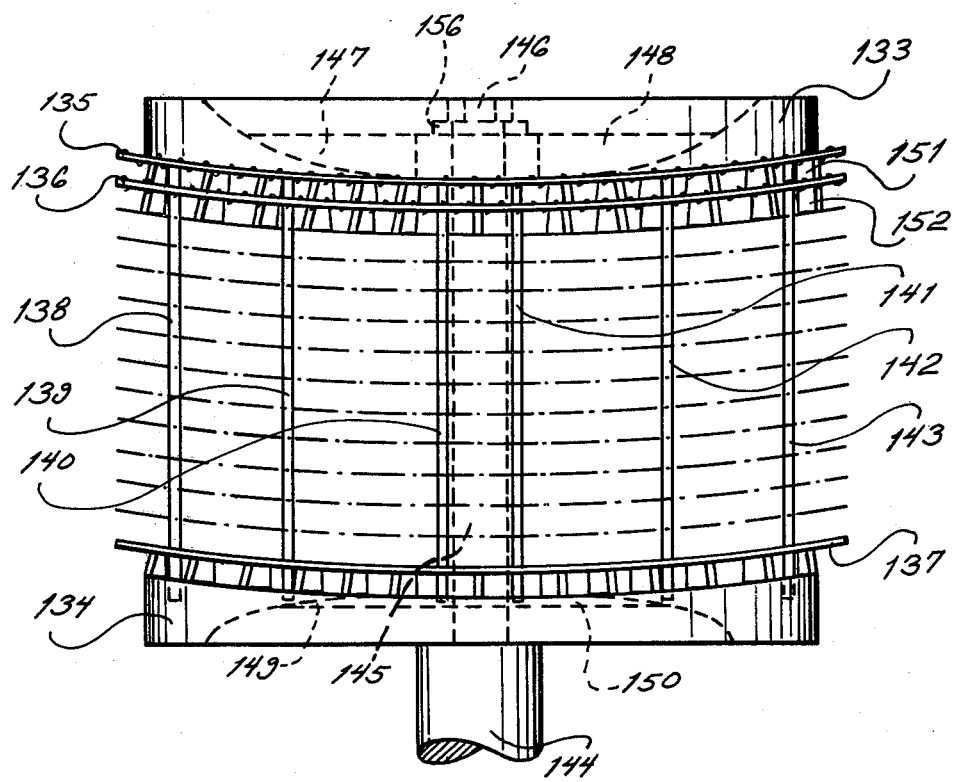
FIG. 1 is a somewhat diagrammatic side-elevational view of a tire rasp according to my invention.

The rasp illustrated in FIG. 1 is seen to comprise a pair of end disks 133, 134 held together by a central bolt 144 whose threaded end is engaged by a nut 156 and counternut 146 within a recess on the outer face of disk 133. Tiers of blades, some of which have been designated 135, 136 and 137, are held together by axially extending mounting rods 138–143 spanning the two disks. If the blades are of segmental shape, as illustrated in FIG. 2, they may be nonoverlappingly juxtaposed within each tier to form a ring.

The blades of the several tiers are held axially separated by spacers 151, 152 in the form of transverse lugs, integral with these blades, as more fully described below with reference to FIG. 2. The presence of these lugs insures the maintenance of clearances between the blade tiers through which cooling air may freely circulate. End disks 133 and 134 are formed with apertures 147, 148 and 149, 150, in any of the shapes described hereinafter with reference to FIGS. 3–6, through which ambient air can be drawn into the rasp body for radial expulsion therefrom through the inter-tier clearances under the action of a centrifugal force due to rotary entrainment of the air volume in those clearances by the spacing lugs 151, 152. Those spacing lugs should therefore be oriented, substantially, in radial planes of the rasp body as likewise shown in FIG. 2.

It will be noted that disk 133 has a cylindrically convex inner face adjoining the tier 135 and that disk 134 has a complementarily concave inner face adjoining the tier 137. The stack of spaced blades sandwiched between these disks, therefore, is similarly curved so that each tier thereof assumes an undulating shape. This is advantageous since it distributes the scraping action of the teeth over the entire workpiece area contacted by the rasp.

Figure 2:
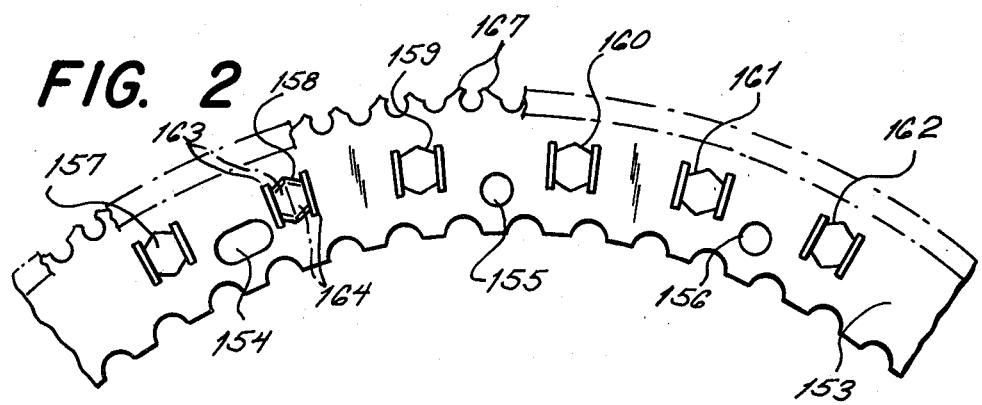
FIG. 2 shows, in face view, part of a blade included in the rasp of FIG. 1.

In FIG. 2 I have shown part of a segmental blade 153 with mounting holes 154–156, the first of them somewhat elongated to allow for manufacturing tolerances, and venting apertures 157–162 of hexagonal configuration. Each of these venting apertures is flanked by a pair of spacing lugs 163, 164 which are integral with blade 153 and are of trapezoidal shape substantially corresponding to half the hexagonal outline of the aperture bracketed thereby as particularly indicated in dot-dash lines for the aperture 158. The lugs of each pair are connected with the blade body on opposite sides of the hexagon, having been partly severed from the sheet-metal strip and separated from each other in the aperture-forming process; they are then bent out of the plane of the blade to come to lie in respective radial planes.

Figure 3:
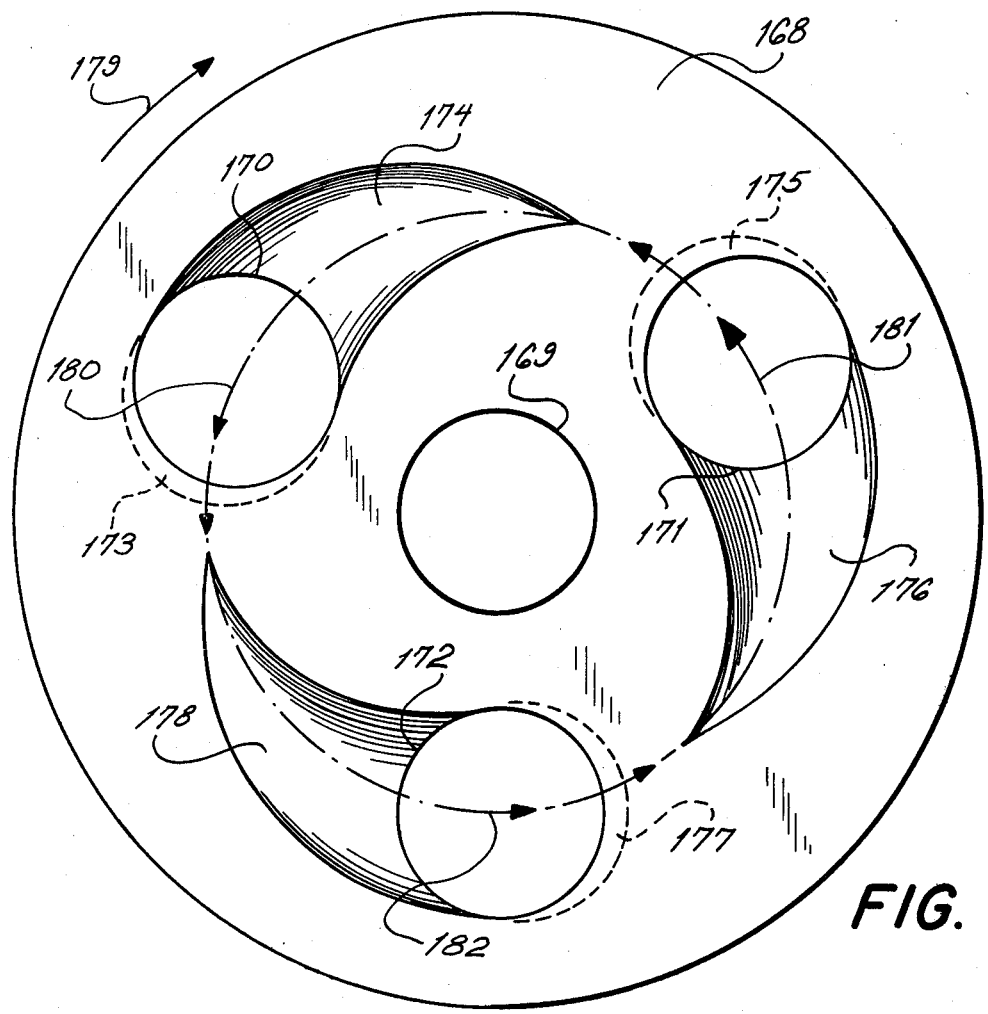
FIG. 3 is a face view of an end disk forming part of a rasp according to my invention.

FIG. 3 shows an end disk 168 with a central bore 169 for the bolt 144 of FIG. 1. Disk 168, designed to rotate clockwise as indicated by an arrow 179, has three apertures 170–172 angularly equispaced about its axis; the inlet ends of the apertures form invertedly funnel-shaped troughs 174, 176, 178 tapering in the direction of rotation at the outer disk faces. These troughs guide the surrounding air into the apertures 170-172 as indicated by arrows 180-182, the air streams being deflected inwardly by the slightly overhanging trailing edges 173, 175, 177 of the aperture mouths which are centered on axes skew to that of disk 168.

Figure 4:
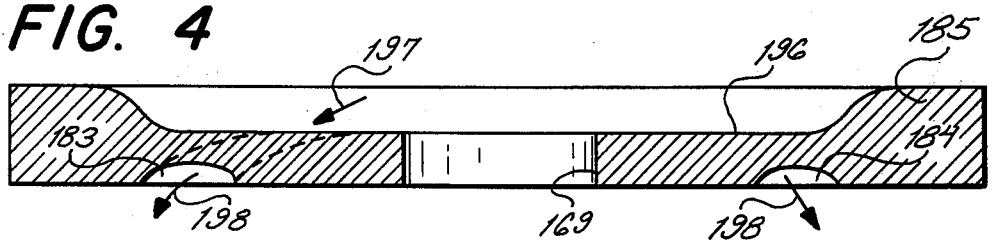
FIG. 4 is a cross-sectional view of a modified end disk.

As illustrated in FIG. 4, a disk 184 provided with a central recess 196 has a pair of diametrically opposite apertures 183 and 184 curving along substantially helical lines about the disk axis so as to form inclined channels for the intake of air as indicated by arrows 197, 198. Again, the axes of the aperture mouths are skew to the disk axis.

Figure 5:
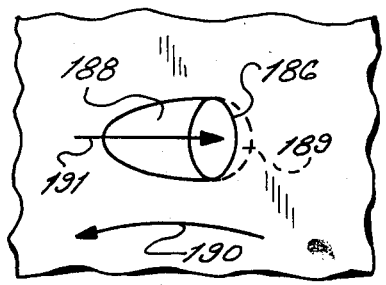
FIGS. 5 and 6 are fragmentary face views of an end disk similar to that of FIG. 3, showing different aperture configurations.

FIG. 5 shows part of a disk surface with an intake aperture 186 terminating in an ovoidal inlet 188 which takes the place of troughs 174, 176, 178 of FIG. 3; with the disk rotating counterclockwise as indicated by an arrow 190, air is again scooped up by the overhanging trailing edge 189 as symbolized by an arrow 191.

Figure 6:
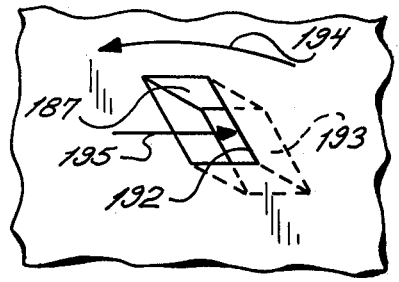

In FIG. 6 the disk, also rotating counterclockwise as indicated by arrow 194, has an aperture 193 of prismatic configuration with an entrance end 187 whose overhanging edge 192 scoops up the air to generate an inward flow symbolized by an arrow 195.

I claim:

1. An abrading tool comprising a cylindrical hollow body with a pair of coaxial apertured end disks, a multiplicity of tiers of annular cutting blades of sheet metal between said disks centered on the disk axis and provided with toothed outer edges projecting beyond the peripheries of said disks, mounting means holding said cutting elements sandwiched between said disks, and lugs integral with said cutting blades separating adjacent tiers with formation of a multiplicity of generally radial passages communicating with the disk apertures for the circulation of cooling air through said body, said lugs lying in substantially radial planes perpendicular to a plane transverse to said axis.

2. A tool as defined in claim 1 wherein one of said disks has an inner face with a cylindrically convex curvature and the other of said disks has an outer face with a complementarily concave curvature, said cutting blades forming an undulating stack.

3. A tool as defined in claim 1 wherein the apertures of at least one of said disks open skew to said axis in the direction of rotation onto the outer disk face.

4. A tool as defined in claim 1 wherein said cutting blades are provided with peripherally spaced venting apertures in the immediate vicinity of said lugs.

5. A tool as defined in claim 4 wherein said lugs are portions of sheet metal bent out of said venting apertures.

6. A tool as defined in claim 4 wherein each of said venting apertures is flanked by a pair of said lugs.

7. A tool as defined in claim 6 wherein said venting apertures are of polygonal outline, each lug of a pair having a shape close to half the polygon of the venting aperture bracketed therebetween.

* * * * *